United States Patent
Gatchalian et al.

(10) Patent No.: US 11,107,064 B2
(45) Date of Patent: Aug. 31, 2021

(54) ERASABLE REUSABLE CHECK

(71) Applicant: Bank of America Corporation, Charlotte, NC (US)

(72) Inventors: Gilbert Gatchalian, Union, NJ (US); Jay Varma, Irving, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 16/211,440

(22) Filed: Dec. 6, 2018

(65) Prior Publication Data
US 2020/0184460 A1    Jun. 11, 2020

(51) Int. Cl.
| | |
|---|---|
| *G06Q 20/34* | (2012.01) |
| *G06Q 20/04* | (2012.01) |
| *G06Q 20/20* | (2012.01) |
| *G06K 7/10* | (2006.01) |
| *G06K 19/07* | (2006.01) |
| G06K 19/077 | (2006.01) |

(52) U.S. Cl.
CPC ....... *G06Q 20/341* (2013.01); *G06K 7/10366* (2013.01); *G06K 19/0723* (2013.01); *G06Q 20/042* (2013.01); *G06Q 20/204* (2013.01)

(58) Field of Classification Search
CPC combination set(s) only.
See application file for complete search history.

(56) References Cited

U.S. PATENT DOCUMENTS

| | | | |
|---|---|---|---|
| 4,737,911 A | | 4/1988 | Freeman, Jr. |
| 4,918,631 A | * | 4/1990 | Hara ............... G06K 19/07 235/380 |
| 5,093,787 A | | 3/1992 | Simmons |
| 5,326,136 A | | 7/1994 | Doyle |
| 5,337,263 A | | 8/1994 | Patermaster |
| 5,903,881 A | | 5/1999 | Schrader et al. |
| 6,679,422 B2 | | 1/2004 | Brown et al. |
| 7,213,003 B1 | | 5/2007 | Kight et al. |
| 7,853,524 B2 | | 12/2010 | Kight et al. |
| 8,126,808 B2 | | 2/2012 | Reid et al. |
| 8,165,956 B2 | | 4/2012 | Kitchen et al. |
| 8,676,706 B2 | | 3/2014 | Jones et al. |

(Continued)

OTHER PUBLICATIONS

Wojciechowska, Iza, "What is ACH Debit?" https://fin.plaid.com/articles/what-is-ach-debit, Nov. 17, 2017.

(Continued)

*Primary Examiner* — Peter Ludwig
*Assistant Examiner* — Reva R Moore
(74) *Attorney, Agent, or Firm* — Weiss & Arons LLP; Michael A. Springs, Esq.

(57) ABSTRACT

Apparatus and methods for an erasable reusable check are provided. The method may include receiving in a card reader a microchip embedded in a check. The method may also include extracting from the microchip data identifying a payor name, a payor address, a bank account number of a payor bank account a routing number of the payor bank account, and pixelated data. The method may further include transforming the pixelated data into written text and creating an Image Replacement Document ("IRD") of the check. The IRD may include the payor name, the payor address, the bank account number, the routing number, and the written text.

7 Claims, 6 Drawing Sheets

(56) References Cited

U.S. PATENT DOCUMENTS

| | | |
|---|---|---|
| 8,874,480 B2 | 10/2014 | Panthaki et al. |
| 8,976,030 B2 * | 3/2015 | Cunningham ....... G08B 13/242 |
| | | 340/572.1 |
| 9,600,837 B2 | 3/2017 | Song et al. |
| 9,665,818 B1 | 5/2017 | Cardinal et al. |
| 9,697,388 B1 | 7/2017 | Jacobson et al. |
| 9,747,539 B1 | 8/2017 | Kendall et al. |
| 9,760,124 B1 | 9/2017 | Johnson et al. |
| 9,858,558 B1 | 1/2018 | Cardinal |
| 9,978,010 B2 | 5/2018 | Cardinal et al. |
| 10,043,183 B2 | 8/2018 | Kurian |
| 2010/0280859 A1 | 11/2010 | Frederick, II |
| 2010/0299258 A1 | 11/2010 | Page |
| 2014/0229374 A1 * | 8/2014 | James ................. G06Q 20/108 |
| | | 705/42 |
| 2017/0357979 A1 | 12/2017 | Khurana et al. |
| 2017/0364997 A1 | 12/2017 | Heddleson et al. |
| 2018/0012295 A1 | 1/2018 | Jacobson |
| 2018/0197031 A1 | 7/2018 | Kurian et al. |
| 2018/0322498 A1 | 11/2018 | Kurian |

OTHER PUBLICATIONS

Kossman, Sienna, "8 FAQs About EMV Credit Cards," https://www.creditcards.com/credit-card-news/emv-faq-chip-cards-answers-1264.php, Aug. 29, 2017.

"Substitute Checks in the United States," https://en.wikipedia.org/wiki/Substitute_checks_in_the_United_States, Jun. 5, 2018.

What is "RFID and How RFID Work?" https://www.abr.com/what-is-rfid-how-does-rfid-work/, Retrieved on Oct. 30, 2018.

Radio-Frequency Identification, https://en.wikipedia.org/wiki/Radio-frequency_identification, Wikimedia Foundation, Inc., Nov. 4, 2018.

Mix, "Samsung Could Add iPhone-Like Pressure-Sensitive Screen on Galaxy S8," https://thenextweb.com/mobile/2017/03/15/samsung-galaxy-s8-iphone-screen-key/, Mar. 15, 2017.

* cited by examiner

ERASABLE REUSABLE CHECK

FIELD OF TECHNOLOGY

Aspects of the disclosure relate to providing apparatus and methods for providing and processing a check. In particular, the disclosure relates to apparatus and methods for providing and processing an erasable reusable check.

BACKGROUND

Paper checks are used daily to pay service providers and vendors. Some individuals and businesses write large volumes of checks in short time periods, necessitating the constant ordering and re-ordering of checks and the struggle to have a sufficient supply of paper checks available to meet demand. Additionally, whenever a mistake is made when writing a check, the payor must void the check and start writing on a new check.

It would be desirable, therefore, to provide apparatus and methods for a check that is erasable and reusable. This is desirable at least because having a single, reusable check frees an individual from the burden of continually reordering paper checks, minimizes his environmental footprint and takes up less space in his wallet.

SUMMARY OF THE DISCLOSURE

Apparatus and methods are provided for an erasable reusable check. The check may include a first portion having first dimensions and a second portion having second dimensions. The second dimensions may be different from the first dimensions. The check may include a pressure-sensitive area embedded in the first portion of the check. The pressure-sensitive area may include an array of pressure-sensitive organic light emitting diodes ("OLEDs") configured to light up when depressed. The pressure-sensitive area may also include a processor for transforming the pressure received by the pressure-sensitive area into pixelated data or other suitable data. The pressure-sensitive area may further include a transmitter for transmitting the pixelated data to a microchip imbedded in the check via a communication means.

The check may include the microchip embedded in the second portion of the check. The microchip may include a non-transitory memory for storing a bank account number, a routing number and payor data. The memory may also store data received from the pressure-sensitive area. The microchip may include a transmitter for transmitting to a Point of Sale terminal the bank account number, the routing number and the data received from the pressure-sensitive area.

The check may also include the communication means positioned in a thickness of the check and being configured to transmit data between the pressure-sensitive area and the microchip. The check may include a battery positioned in the thickness for providing power to the OLEDs.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for an erasable, reusable check are provided. The check may be provided to a customer by a banking institution. The customer may be the payor of the check and may be referred to alternately herein as the "payor". The check may be used by the customer to pay for goods and services. The check may or may not display customer data, such as a customer name and/or customer address on a face of the check. The check may be provided to the customer pre-loaded with customer banking data, such as a customer bank account number and a routing number associated with the customer's bank account. The customer banking data may or may not be displayed on the check.

The apparatus may include an erasable, reusable check. The check may include a first portion having first dimensions and a second portion having second dimensions. The second dimensions may be different from the first dimensions. The first portion may be integral with, and extend away from, the second portion. The first and second portion may together form the check.

The first portion of the check may have the dimensions of a typical check, such as a length of 6 inches and a width of 2¾ inches. The first portion of the check may have the width of a typical check, such as 6 inches, but a different length. The first portion of the check may have any other suitable length and/or width.

The thickness of the second portion of the check may be the thickness of a standard credit card, such as 0.76 mm, or about 0.76 mm. The thickness of the first and second portion may be 0.76 mm. The thickness of the first and second portion may be about 0.76 mm. The thickness of the first and/or second portion may be any other suitable thickness. For the purposes of the application the term "about" refers to +/−10% of a defined value.

The check may not display data identifying a customer name. The display of data on a check refers to data being printed, embossed, marked or otherwise viewable on a face of the check. The check may not display data identifying a customer address. The check may not display data identifying a bank account number. The bank account number may be a bank account number of the customer. The check may not display data identifying a routing number, the routing number being a routing number of the customer's bank account identified by the bank account number. The check may not display a Magnetic Ink Character Recognition ("MICR") line.

In some embodiments, the check may display data identifying one or more of a customer name, customer address, a bank account number, a routing number and/or a MICR line.

The check may include a pressure-sensitive area embedded in the first portion of the check. The pressure-sensitive area may include an array of pressure-sensitive organic light emitting diodes ("OLEDs") configured to light up when depressed. The pressure-sensitive area may also include a processor for transforming the pressure received by the pressure-sensitive area into pixelated data. The pressure-sensitive area may further include a transmitter for transmitting the pixelated data to a microchip via a communication means.

In alternate embodiments, the processor may transform the pressure received by the pressure-sensitive area into data different from pixelated data. Although the pressure-sensitive area on the check is referred to herein as including OLEDs, any other pressure-sensitive medium may be used to capture and store data written on the check.

The pressure-sensitive area may include permanent markings positioned on a top face of the pressure-sensitive area and viewable to a customer, such as permanent markings displayed in FIGS. 1, 2, 5 and 6. The permanent markings may guide the customer to input check-related data, such as amount, payee name, data, a memo, etc., on the pressure-sensitive area. The pressure-sensitive area may tag data input into the pressure-sensitive area as described below in reference in FIG. 1.

The OLEDs may be configured to display the strokes of an inkless pen or any other instrument, such as a finger or a pen cap, when the instrument applies pressure to the pressure sensitive area.

The check may include the microchip (referred to alternately hereinafter as a "chip") embedded in the second portion of the check. The microchip may include a non-transitory memory. The memory may store the customer's bank account number and the routing number. The microchip may store a customer name and a customer address. The microchip may store an image of a MICR line. Some of the data stored on the microchip may not be displayed on the check. All of the data stored on the microchip may not be displayed on the chip. Prior to sending the erasable, reusable check to a customer, the chip may be pre-loaded with the aforementioned customer data.

Customer data stored on the microchip, such as a bank account number, routing number, customer name, address, and a MICR line, may not be erasable or overwritable. In the event that the data stored on chip changes, such as if the customer moves or wants to use a different bank account to draw his checks on, the check may need to be destroyed and new check may need to be issued with the updated customer data.

Customer data stored on the microchip may be overwritable. For example, a customer may insert his check into a chip reader at a banking institution and select to update his bank account number, customer address, or any other stored customer data. The chip reader may send a message to the chip to overwrite the stored data with the new data requested by the customer. This may enable the check to be used and re-used even after check-specific customer data has been changed.

The microchip may receive from the communication means data input into the pressure-sensitive area. The microchip's memory may store this data temporarily, until a notification is received from a Point of Sale terminal that the check has been processed, after the lapse of a predetermined time period, or after the depression of a button or sensor on the check, the depression notifying the memory to delete the temporarily stored data.

The microchip may also include a transmitter for transmitting to a Point of Sale terminal the data stored on the microchip, the data including the customer data and the data received from the pressure-sensitive area.

In some embodiments, the microchip may generate a one-time code each time it is inserted into a Point of Sale terminal. The one-time code may be used by the Point of Sale terminal to verify the authenticity of the transaction.

The check may further include the communication means positioned in a thickness of the check. The communication means may be in electronic communication with the pressure-sensitive area and the chip. The communication means may be configured to transmit data between the pressure-sensitive area and the microchip. The communication means may be a wire or any other suitable apparatus. The communication means may extend between the first and second portions of the check.

The check may include a battery positioned in the thickness for providing power to the OLEDs.

The OLEDs may be configured to turn off upon receipt of an instruction from the microchip via the communication means. The microchip may generate the instruction upon receipt of a message from a Point of Sale terminal or after the lapse of a predetermined time period.

The check may include a button. The button, when depressed, may instruct some or all of the OLEDs to turn off.

The second portion of the check may have a first side, a second side and a third side. The first side may be positioned opposite the second side. The third side may connect the first and second side and may be perpendicular to the first and second side.

The second side may be positioned 53.98 mm away from the first side. The second side may be positioned about 53.98 mm away from the first side.

The second portion may include a first rounded corner connecting the first side and the third side. The second portion may include a second rounded corner connecting the third side and the second side. Each rounded corner may have a radius between 2.88 mm and 3.48 mm. Each rounded corner may have a radius between about 2.88 mm and about 3.48 mm.

The chip may be an EMV (Europay Mastercard Visa) chip. The chip may operate according to the protocols and standards of an EMV chip. The chip may have the dimensions of an EMV chip.

The chip may have a length of 1³⁄₁₀th cm. The chip may have a width of 1⅕th cm. The chip may be spaced 1⅘th cm apart from the first side. The chip may be spaced 2⅖th cm apart from the second side. The chip may be spaced ⅘th cm apart from the third side.

The chip may have a length of about 1³⁄₁₀th cm. The chip may have a width of about 1⅕th cm. The chip may be spaced about 1⅘th cm apart from the first side. The chip may be spaced about 2⅖th cm apart from the second side. The chip may be spaced about ⅘th cm apart from the third side.

The chip may be positioned on the second portion of the check at a position different from the aforementioned position. The chip may have any other suitable dimensions, such as dimensions different from an EMV chip. The chip may have the dimensions of an EMV chip but may operate differently from an EMV chip.

The check may include a first face and a second face opposite the first face. The microchip and the pressure-sensitive area may be positioned on the first face. The communication means may be positioned in a thickness of the check between the first and second face. The battery may be accessible from the second face. The battery may be accessible from the first face.

A customer may write data onto the pressure-sensitive area of his check. The pressure-sensitive area may pixilate the data and transmit it to the chip via the communication means. The customer may then insert the second portion of the check into a chip reader included in POS terminal.

The POS terminal may include a processor. The processor may verify the authenticity of the data transmission. For example, in some embodiments, the processor may verify that a one-time passcode generated by the chip is accurate.

The processor may determine if the pixelated data includes data necessary to send the check for ACH processing. For example, the processor may transform the pixelated data into an image, perform one or more text-recognition routines on the image such as Optical Character Recognition ("OCR"), and determine if a payee name and a dollar amount for transferring to the payee are extractable from the pixelated data.

If the processor determines that the pixelated data does not identify a payee name, a dollar amount, or if the data received from the chip does not identify a customer name, address, a valid routing number and/or a valid account number, the processor may instruct a POS display included on the POS terminal to display a message that the check cannot be processed and/or request additional information to make up for the data deficiency. The POS display may subsequently emit an audio sound, such as a beep, and/or flash a light, to convey to the check customer that the check cannot be processed. In some embodiments, a customer may be prompted to input the missing data into a POS keypad/display If the processor extracts from the pixelated data a payee name and a dollar amount, and receives from the chip a valid routing number and account number, and any other required stored data, the processor may instruct the POS display to display a message that the check has been accepted and will be processed. The processor may place the data into a data packet and instruct a transmitter to send the data packet to an Automated Clearing House "ACH" for processing.

In some embodiments, the processor may instruct the transmitter to send the data packet to a computing device storing a blockchain and supporting blockchain mining capabilities. The computing device may perform one or more validation routines on the transaction and, if the transaction is determined to be valid, add the transaction to a block. Once the block is complete, the computing device may add the block to the computing device's local blockchain and transmit the block to all other computing devices that store the blockchain.

The apparatus may include an erasable, reusable check. The check may have a first face and a second face opposite the first face. A first portion of the first face and a first portion of the second face may be covered with paper.

The check may be flexible. The check may be rigid.

The thickness of the check may be no greater than 0.8 millimeters. The thickness of the check may be no greater than 0.78 mm. The thickness of the check may be no greater than about 0.78 mm. The thickness of the check may be any other suitable thickness.

The check may have the dimensions of a standard check, such as a length of 6 inches and a width of 2¾ inches. The check may have a length of about 6 inches and a width of about 2¾ inches. The check may have dimensions different from a standard check.

In some embodiments, the check may not display one or more of a customer name, a customer address, a bank account, a routing number, and a MICR line. In some embodiments, the check may display one or more of a customer name, a customer address, a bank account, a routing number, and a MICR line.

The check may include an active radio frequency identification ("RFID") tag. The RFID tag may be an active RFID tag. The RFID tag may be a passive RFID tag. The check may include an RFID antenna positioned between the first and second face. The RFID tag may store the customer's bank account number and a routing number. The RFID tag may store the customer's name, address and/or a MICR line.

The check may include the pressure-sensitive area on the first face. The pressure-sensitive area may include the array of pressure-sensitive organic light emitting diodes ("OLEDs") configured to light up when depressed. The pressure-sensitive area may include the processor for translating the pressure received by the pressure-sensitive area into pixelated data. The pressure-sensitive area may include a transmitter for transmitting the pixelated data to the RFID tag via a communication means.

In alternate embodiments, the processor may transform the pressure received by the pressure-sensitive area into data different from pixelated data. Although the pressure-sensitive area on the check is referred to herein as including OLEDs, any other pressure-sensitive medium may be used to capture and store data written on the check.

The pressure-sensitive area may include permanent markings positioned on a top face of the pressure-sensitive area and viewable to a customer, such as permanent markings displayed in FIGS. 1, 2, 5 and 6. The permanent markings may guide the customer to input check-related data, such as amount, payee name, data, a memo, etc., on the pressure-sensitive area. The pressure-sensitive area may tag data input into the pressure-sensitive area as described below in reference in FIG. 1.

The OLEDs may be configured to display the strokes of an inkless pen or any other instrument, such as a finger or a pen cap, when the instrument applies pressure to the pressure sensitive area.

The check may include the communication means. The communication means may be positioned between the first and second face and being configured to transmit data between the pressure-sensitive area and the RFID tag. The communications means may be a wire or any other suitable apparatus for transmitting information.

The check may include a battery positioned between the first and second face and accessible from the second face. The battery may provide electricity to the OLEDs.

The OLEDs may be configured to turn off upon receipt of an instruction from the RFID tag via the communication means. The RFID tag may generate the instruction upon receipt of a message from an RFID reader that the data transmitted to the RFID reader has been received. The OLEDs may be configured to turn off upon the lapse of a predetermine time period.

The button may be a first button. The check may include a second button that, when depressed, instructs the OLED display to turn off.

The check may include a metal cover. The metal cover may be coupled to the first face and rotatable between a first position and a second position. The metal cover, in the first position, may cover the RFID tag. The metal cover, in the second position, may not cover the RFID tag. The metal cover may prevent unauthorized capturing of data stored on the RFID tag by blocking radio waves attempting to activate the tag.

The RFID tag may include a non-transitory memory. The memory may store the bank account number and the routing number. The memory may store the customer name, customer address and/or a MICR line. The memory may include overwritable data storage for storing the pixelated data. The overwritable data storage may be erased upon the receipt of a message by the RFID tag from a POS device that data transmitted from the RFID tag to the RFID reader has been received. The overwritable data storage may be erased upon the lapse of a predetermined time period or upon depression of a button included in the check, depression of the button instructing the OLEDs to turn off.

Some of the data stored on the RFID tag may not be displayed on the check. All of the data stored on the RFID tag may not be displayed on the chip. Prior to sending the erasable, reusable check to a customer, the RFID tag may be pre-loaded with the customer data described herein.

Customer data stored on the RFID tag, such as the bank account number, the routing number, the customer name, the customer address, and the MICR line may not be erasable or overwritable. In the event that the data stored on the RFID tag changes, such as if the customer moves or wants to use a different bank account to draw his checks on, the check may need to be destroyed and new check may need to be issued with the updated customer data.

Customer data stored on the RFID tag may be overwritable. For example, a customer may place his check in communication with an RFID reader at a banking institution and select to update his bank account number, customer address, or any other stored customer data. The RFID reader may send a message to the RFID tag to overwrite the stored data with the new data requested by the customer. This may enable the check to be used and re-used even after check-specific customer data has been changed.

In embodiments where the RFID tag is an active RFID tag, the check may include a button positioned on the first face. Depression of the button may activate the RFID antenna to the transmit data stored in the RFID tag to an RFID reader. The active RFID tag may be configured such that the RFID tag only transmits data in response to depression of the button. This may ensure that the check's data is secure and cannot be read by a different device. The RFID antenna may transmit the data to the RFID reader such that the data can only be read within 1 foot, 2 feet, three feet, 1 meter, or any other suitable distance, of the RFID antenna. Limiting the area of the data transmission may further enhance the data's security. The transmitted data may include the bank account number, the routing number, the pixelated data and any other data stored in the RFID tag such as the customer name, address, and/or MICR line. The antenna may transmit the data using radio waves. The check may include a power source, such as a battery, to power the active RFID tag.

Depression of the button may initiate a transfer of data from the pressure-sensitive area to the RFID tag.

In embodiments where the RFID tag is a passive RFID tag, the RFID reader may power up the RFID tag and initiate a data transmission of data from the RFID tag to the RFID reader. In embodiments where the RFID tag is a passive RFID tag, the check may or may not include the button.

The RFID reader may receive the data stored on the RFID tag and transmitted by the RFID antenna. The RFID reader may transmit the data to a POS terminal. The RFID reader may be integral with a POS terminal. The POS terminal may include a processor. The processor may verify the authenticity of the data transmission. For example, in some embodiments, the processor may verify that a header of the data transmission is hashed using a security key.

The processor may determine if the pixelated data includes data necessary to send the check for ACH processing. For example, the processor may transform the pixelated data into an image, perform one or more text-recognition routines on the image such as Optical Character Recognition ("OCR"), and determine if a payee name and a dollar amount for transferring to the payee are extractable from the pixelated data.

If the processor determines that the pixelated data does not identify a payee name, a dollar amount, or if the data received from the RFID tag does not identify a customer name, address, a valid routing number and/or a valid account number, the processor may instruct a POS display included on the POS terminal to display a message that the check cannot be processed and/or request additional information to make up for the data deficiency. The POS display may subsequently emit an audio sound, such as a beep, and/or flash a light, to convey to the check customer that the check cannot be processed. In some embodiments, a customer may be prompted to input the missing data into a POS keypad/display If the processor extracts from the pixelated data a payee name and a dollar amount, and receives from the RFID tag a valid routing number and account number, and any other required stored data, the processor may instruct the POS display to display a message that the check has been accepted and will be processed. The processor may place the data into a data packet and instruct a transmitter to send the data packet to an Automated Clearing House "ACH" for processing.

In some embodiments, the processor may instruct the transmitter to send the data packet to a computing device storing a blockchain and supporting blockchain mining capabilities. The computing device may perform one or more validation routines on the transaction and, if the transaction is determined to be valid, add the transaction to a block. Once the block is complete, the computing device may add the block to the computing device's local blockchain and transmit the block to all other computing devices that store the blockchain.

The methods may include a method for processing a check on behalf of a payor using data stored on a microchip embedded in the check. The method may be performed by a Point of Sale device, a computer, a central processing unit stored in a cloud, and/or any other suitable hardware. The method is described as being performed on a check including a chip. However, the method may be performed on a check having data stored on a RFID tag as described herein.

The method may include receiving in a card reader a microchip embedded in a check. The method may include extracting from the microchip data identifying a one or more of a payor name, a payor address, a bank account number of a payor bank account, a routing number of the payor bank account and/or pixelated data. The payor may be the customer. When the data is stored in an RFID tag, the data may be transmitted to an RFID reader by an RFID antenna.

The method may include transforming the pixelated data into written text. The method may include creating an Image Replacement Document ("IRD") of the check, the IRD including the payor name, the payor address, the bank account number, the routing number, and the written text. The method may also include transmitting the IRD to an Automated Clearing House ("ACH") for processing.

The microchip or, in other embodiments, the RFID tag, disclosed herein may store additional check data that may be used to create the IRD. For example, the microchip, or, in other embodiments, RFID tag, may store an image of a back of the check (which may or may not be printed on a back side of the smart check), a MICR line (which may or may not be printed on a front face of the smart check), and any other suitable check data that may be required to generate an IRD in accordance with the Check Clearing for the 21$^{st}$ Century Act (hereinafter, the "Check 21 Act").

The IRD, when generated, may include text stating 'This is a LEGAL copy of your check. You can use it the same way you would use the original check'.

The method may further include displaying on a POS screen the IRD and a selectable option presenting the customer with an opportunity to validate the accuracy of the IRD. For example, the customer may be presented with the option to select either a first button stating "I agree" or a second button stating "I decline" prior to the check being processed. The method may also include transmitting the IRD to a remote processor to validate the transaction and to add the transaction to a block included in a permissioned blockchain. The IRD may be transmitted only after the receipt of the customer's instructions, such as the selection of the "I agree" button.

When the written text does not identify a payee or a dollar amount for transferring to the payee, the method may include transmitting a message to the microchip or, in other embodiments, the RFID tag, that the check cannot be processed. When the written text does not identify a payee or a dollar amount for transferring to the payee, the method may also include instructing the card reader to play a prerecorded sound on a card reader speaker and/or to flash a red light included in the card reader, indicating that there is an error and the check cannot be processed.

In some embodiments, the POS terminal may enable a user to input into a POS screen or keypad the data missing from the check.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
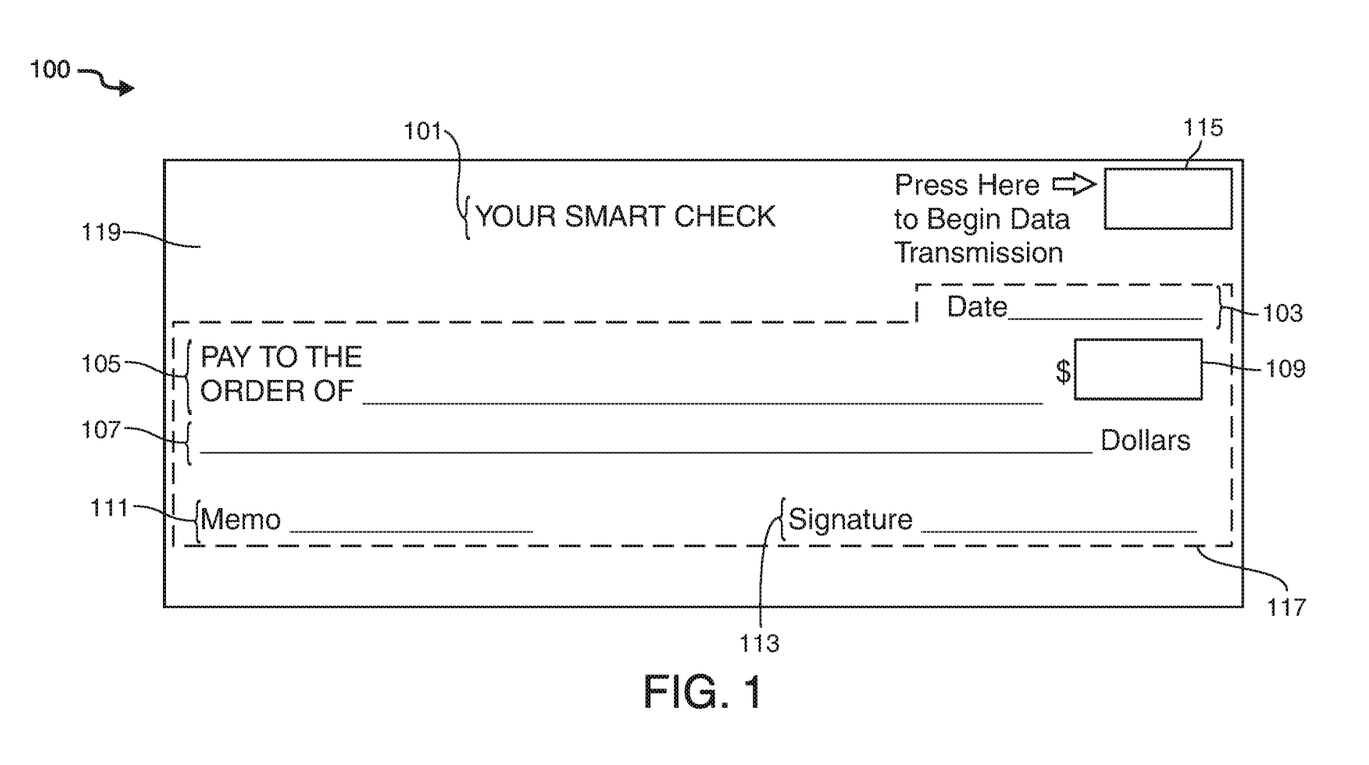
FIG. 1 shows an illustrative check in accordance with the invention.

FIG. 1 shows illustrative check 100. Check 100 may include text 101.

Check 100 may include pressure-sensitive area 117. Pressure-sensitive area 117 may include a plurality of OLEDs configured to light up when depressed. Each OLED, when depressed, may light up. The OLEDs may light up in black, blue or any other suitable color. Therefore, writing with an ink-less pen, a finger, or any other instrument across pressure-sensitive area 117 may activate the OLEDs to display the strokes of the instrument on check 100. This may enable a customer to view the information received by the pressure-sensitive area.

Pressure-sensitive area 117 may include permanent markings positioned on a top face of pressure-sensitive area 117 and viewable to a customer. The permanent markings may guide a customer's input of information into check 100. The markings may include "PAY TO THE ORDER OF" and corresponding line 105, "Date" and corresponding line 103, Box 109, "Dollars" and corresponding line 107, "Memo" and corresponding line 111 and "Signature" and corresponding line 113.

The pressure-sensitive area may include the processor. The processor may pixelate the strokes received by the pressure-sensitive area. The processor may pixelate writing received on, within or adjacent to each of the permanent markings and tag the data accordingly. For example, text written into box 109 may be pixelated and tagged as 'dollar amount', text written on corresponding line 111 may be pixelated and tagged 'memo', text written on corresponding line 113 may be pixelated and tagged 'signature', etc. The tagging of the data may assist in the efficient processing of the data by a POS terminal.

Check 100 may include an RFID tag and an RFID antenna (not shown). Check 100 may additionally include a communication means, such as a wire, connecting pressure-sensitive area 117 and the RFID tag.

Check 100 may include button 115. Button 115, when depressed, may initiate transmission of data stored in the RFID tag. The data may be transmitted to an RFID reader by an RFID antenna (not shown) positioned in a thickness of check 100.

Check 100 may include an additional button (not shown). The additional button, when depressed, may instruct all illuminated OLEDs to turn off.

Figure 2:
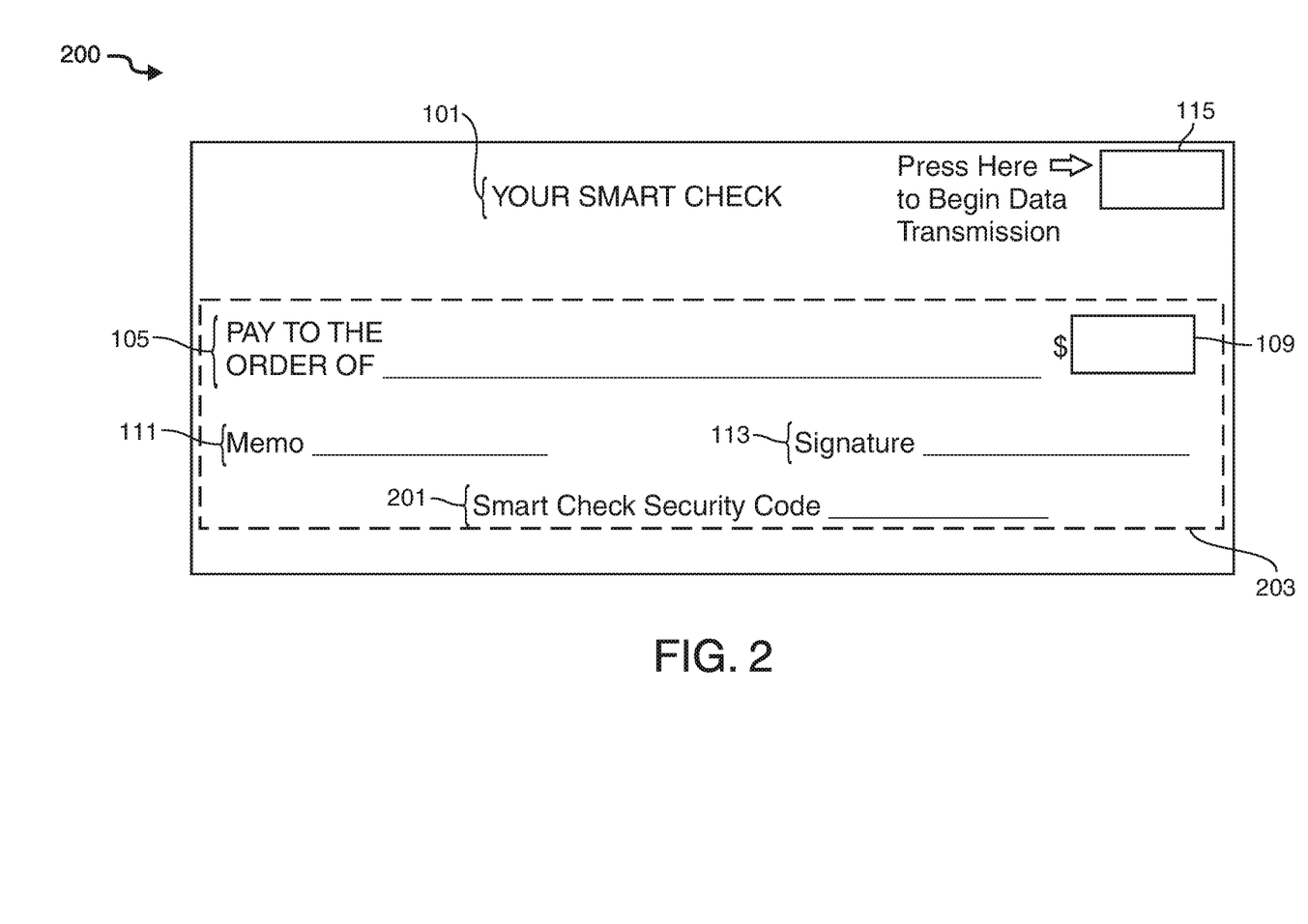
FIG. 2 shows an illustrative check in accordance with the invention.

FIG. 2 shows illustrative check 200. Check 200 may have one or more features in common with check 100. Illustrative check 200 may include pressure-sensitive area 203. Pressure-sensitive area 203 may include a plurality of OLEDs configured to light up when depressed. Each OLED, when depressed, may light up. Pressure-sensitive area may have one or more characteristics in common with pressure-sensitive area 117.

Pressure-sensitive area 203 may include text 101, button 115 and permanent markings 105, 109, 111 and 113 described above in connection with FIG. 1.

Pressure-sensitive area may include permanent marking 'Smart Check Security Code 201.' The smart check security code may be a code known to an owner of smart check 200. The code may include three, four or more numbers, letters and/or symbols. The owner may be notified of his code when receiving the smart check, or the owner may select the code using an online banking portal. The code may remain the same until it is changed by the owner. The code may be a one-time passcode generated by the owner's mobile banking application.

The code may be pixelated by a processor incorporated in the pressure-sensitive area. The code may be transmitted by the RFID antenna incorporated into check 200 to an RFID reader in a Point of Sale terminal ("POS"). The POS terminal may authenticate the validity of the smart check security code prior to preparing the check for processing. If the code is incorrect, the POS terminal may deny the check. If the code is correct, the POS terminal may begin preparing the check for ACH batch processing.

One or more of the checks in accordance with the invention described herein, such as embodiments including a microchip or a RFID tag, may include the data input field '201' and the POS terminal authentication procedure described in connection to FIG. 2.

Figure 3:
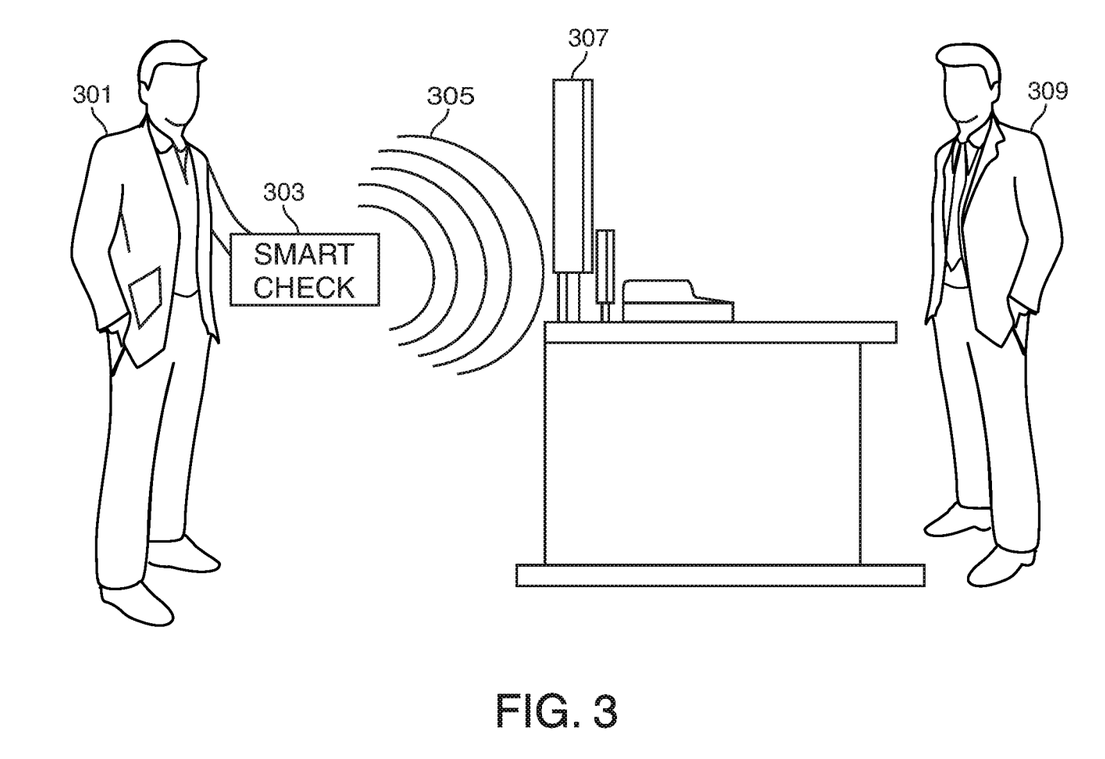
FIG. 3 shows an illustrative process in accordance with the invention.

FIG. 3 shows an illustrative process in accordance with the invention. In FIG. 3, customer 301 owning smart check 303 has pressed a button on smart check 303 to activate RFID data transmission 305 of smart check data from smart check 303 to POS terminal 307. Cashier 309 is illustrated standing behind POS terminal 307 and overseeing the data transmission.

It should be noted that, in some embodiments, a cashier may not be needed to effectuate the 'cashing' of smart check 303, and any other smart checks described herein. Instead, an owner of a smart check may fill in the check data, press the data transmission button, and wait for the POS terminal to receive and process the data transmitted from the smart check. In embodiments where the check data is stored on a chip, the customer may input the chip into a chip reader and wait for the POS terminal to receive and process the data transmitted from the smart check.

The POS terminal may verify that the check data is accurate and/or that all data needed to process the check has been received, such as the owner's bank account number, routing number, payee name and check amount, and, in some embodiments, the correct one-time passcode.

When the POS terminal has verified that all check data needed has been received, the POS terminal may create a substitute check and display it to the owner on a POS display. The substitute check may comply with the Check 21 Act and resemble a standard check that includes the customer's written data received from smart check 303. The customer may be presented with a selectable option to confirm the accuracy of the substitute check and to proceed with the transaction, or to deny the accuracy of the substitute check and either cancel the transaction or re-submit the check data. In the event that the customer selects the option to proceed with the transaction, POS terminal 303 may transmit the check to an ACH platform for batch processing. The POS terminal 303 may issue a receipt to the customer indicating that the transaction has been completed. In some embodiments, POS terminal 303 may transmit the check data to a computing platform having blockchain mining capacities, and that will insert the check data into a block to be included in a blockchain.

Figure 4:
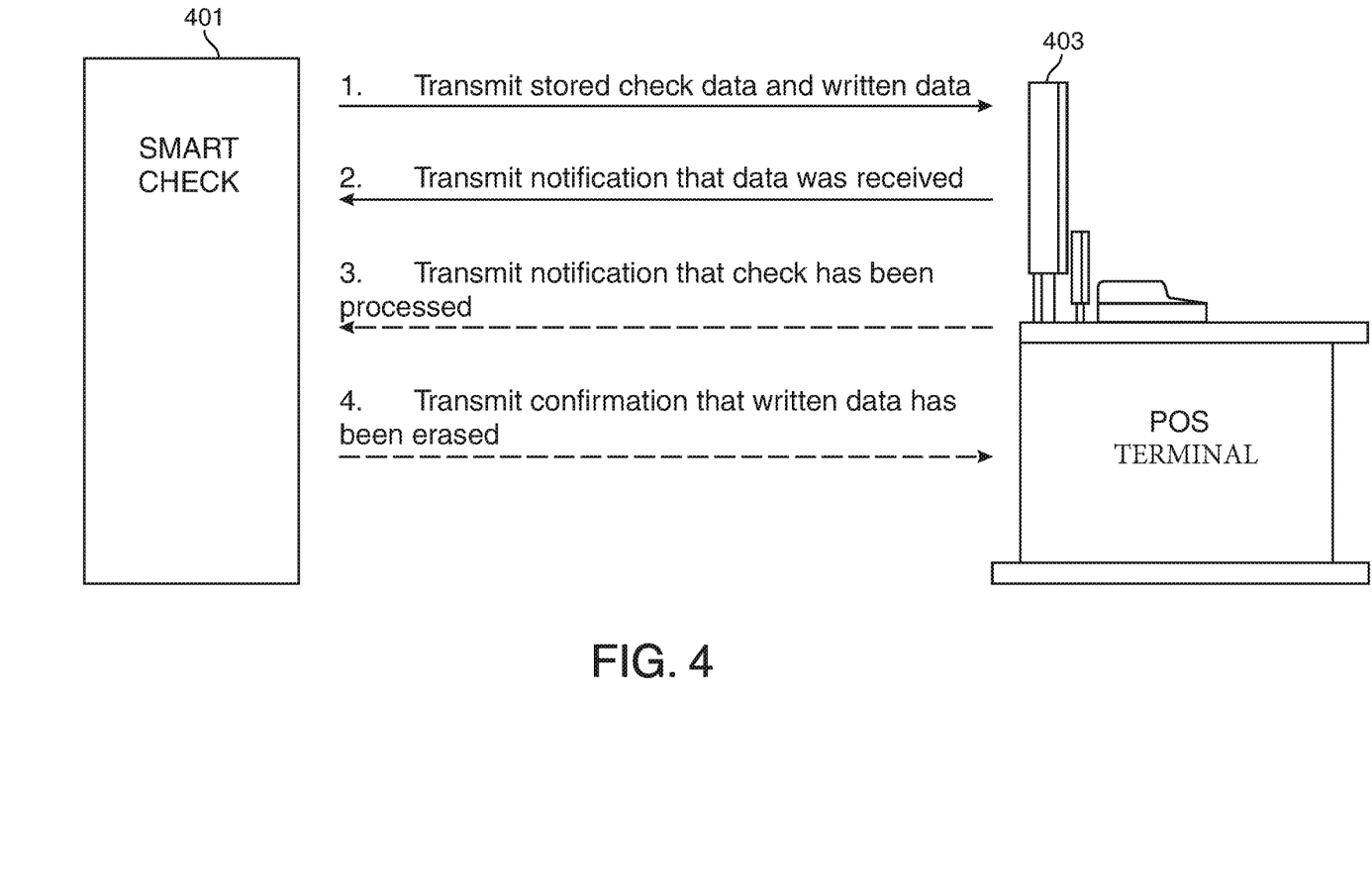
FIG. 4 shows illustrative process in accordance with the invention.

FIG. 4 shows an illustrative process in accordance with the invention. At step 1, the process may include check 401 transmitting stored check data and written data to POS terminal 403. Check 401 may be a check illustrated in one of FIGS. 1, 2, 5 and 6. Check 401 may have one or more features of a check disclosed herein.

The stored check data may include a checking account number and a routing number or any other stored check data described herein. The stored check data may be stored in an RFID tag or in a microchip. The written data may include the text written by the customer onto a pressure-sensitive area of his check. The written data may be pixelated and tagged by a processor incorporated into the pressure-sensitive area. When the check data is stored in an RFID tag, the data may be transmitted by an RFID antenna to an RFID reader included in POS terminal 403. When the check data is stored in a microchip, the data may be transmitted by inserting the microchip into a chip reader included in POS terminal 403.

At step 2, POS terminal 403 may transmit a notification to check 401 using radio waves or through the chip reader. The notification may notify check 401 that the check data was received.

After receipt by check 401 of the notification in step 2, check 401 may instruct all light OLEDs to turn off their luminescence. After receipt by check 401 of the notification in step 2, check 401 may also delete all stored pixelated data. This may re-set check 401 and prepare check 401 for receiving data for a new check.

At optional step 3, POS terminal 403 may transmit data to check 401 indicating that the check has been processed. For the purposes of the application, 'processing the check' may refer to the extracting of all required check data received at step 1, creating a substitute check, and transmitting the substitute check to an ACH platform for processing or to a blockchain minor for being included in a blockchain.

At optional step 4, check 401 may optionally transmit data to POS terminal 403 that the data written on check 401 has been erased. Data written on check 401 may be erased by one or both of deleting all pixelated data stored on check 401 and instructing all lit OLEDs to turn off. In some embodiments, POS terminal 403 may transmit this data to the blockchain minor. This data may be included in the block as a demarcation between transactions.

Figure 5:
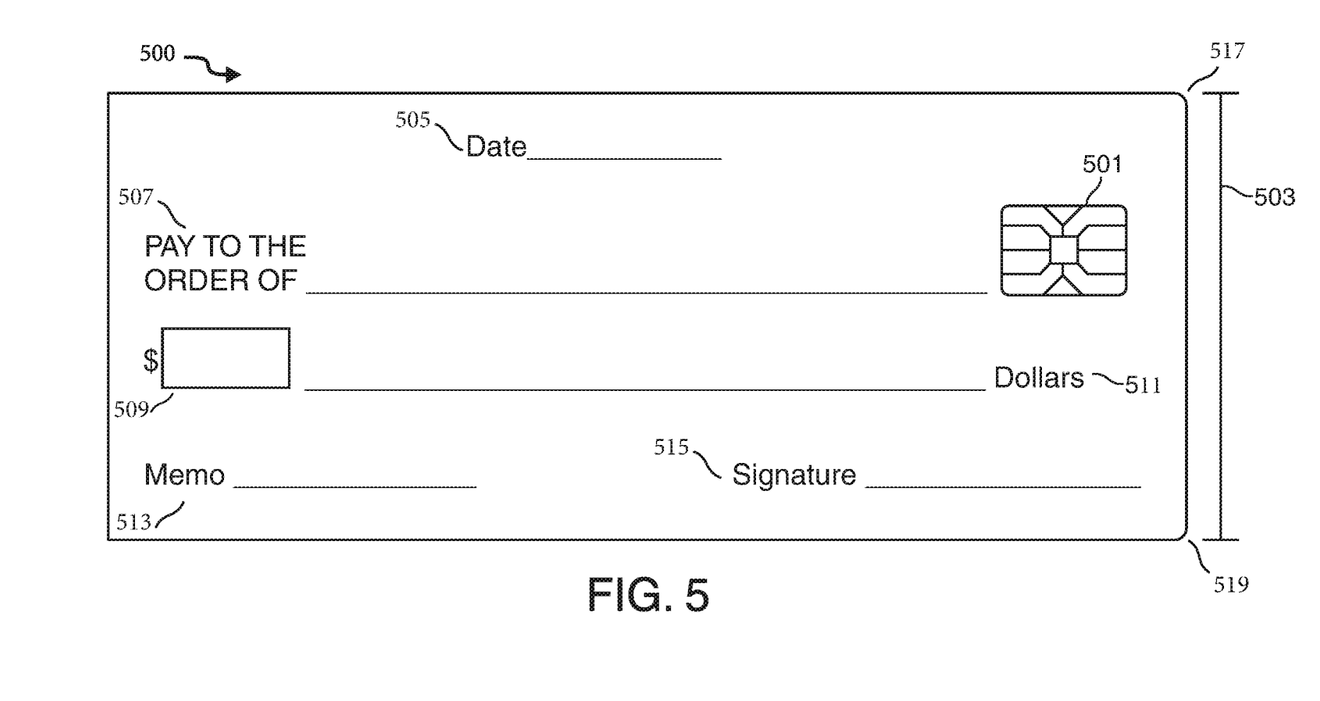
FIG. 5 shows an illustrative check in accordance with the invention.

FIG. 5 shows illustrative check 500. Check 500 may include microchip 501.

Microchip 501 may store a bank account number, a routing number, and any other data described herein.

Check 500 may include a pressure-sensitive area including a plurality of OLEDs. The pressure-sensitive area may include permanent demarcations on top of the OLEDs. Exemplary permanent demarcations may include "Date" and corresponding line 505, "PAY TO THE ORDER OF" and corresponding line 507, box 509, "Dollars" and corresponding line 511, "Memo" and corresponding line 513 and "Signature" and corresponding line 515.

Check 500 may have width 503. Width 503 may be a width of a standard credit card. Check 500 may have rounded edge 517 and rounded edge 519. Rounded edges 517 and 519 may have the radius of the rounded edges described herein, such as a radius within the limits of a standard credit card's rounded edges. For example, each rounded corner may have a radius between 2.88 mm and 3.48 mm.

Chip 501 may be positioned on check 500 at a position so that, when check 500 is inserted into a card reader, a standard chip reader is able to read data stored on chip 501. Exemplary positioning of chip 501 on check 500 may include the distances described above in reference to the distance of the chip between the first, second and third sides.

Figure 5A:
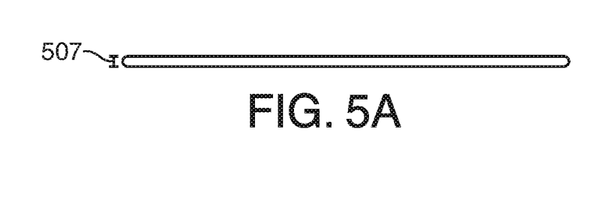
FIG. 5A shows a side view of a check shown in FIG. 5.

FIG. 5A shows a side view of check 500 illustrated in FIG. 5. The side view may be taken along a width of check 500. Check 500 may have a thickness 507. Thickness 507 may be a thickness of a standard credit card. This may enable check 500 to be inserted into a card reader.

Figure 6:
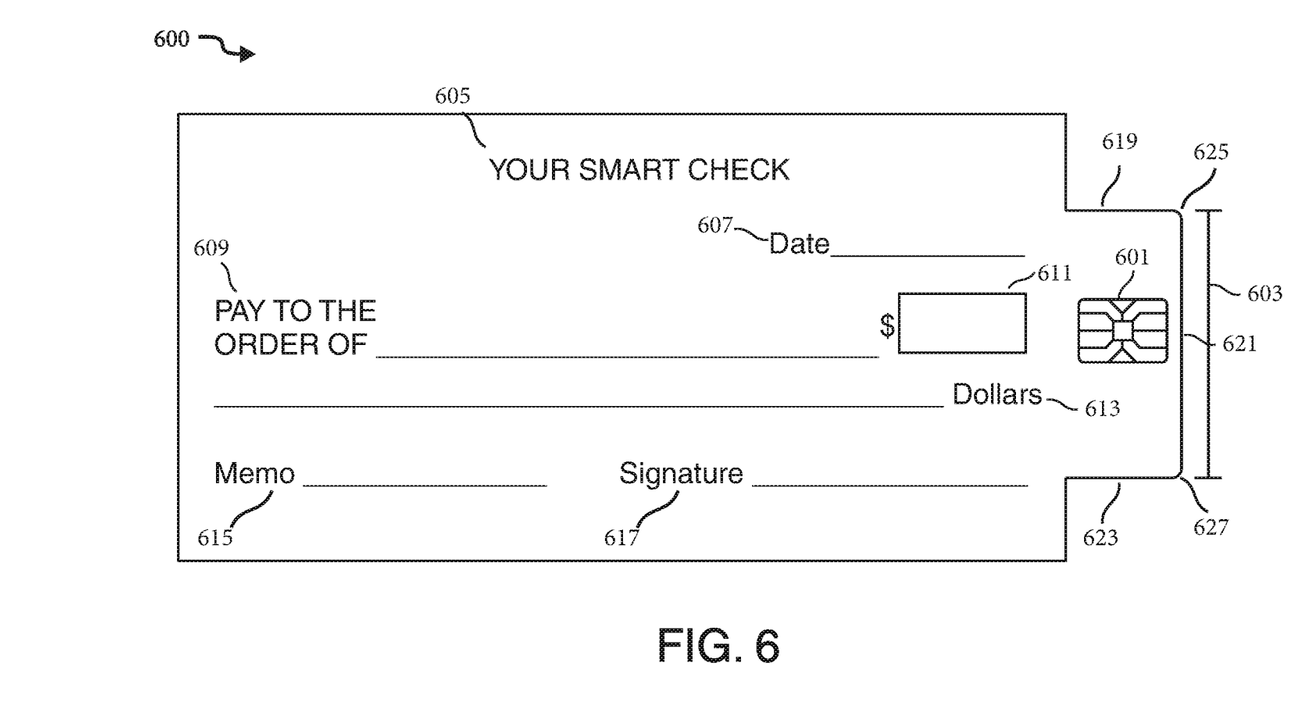
FIG. 6 shows an illustrative check in accordance with the invention.

FIG. 6 shows illustrative check 600. Check 600 may include microchip 601.

Microchip 601 may store a bank account number, a routing number, and any other data described herein. Chip 601 may be positioned on the second portion at a position so that, when check 600 is inserted into a card reader, a standard chip reader is able to read data stored on chip 601.

Check 600 may include text 605. Check 600 may include a pressure-sensitive area including a plurality of OLEDs. The pressure-sensitive area may include permanent demarcations on top of the OLEDs. Exemplary permanent demarcations may include "Date" and corresponding line 607, "PAY TO THE ORDER OF" and corresponding line 609, box 611, "Dollars" and corresponding line 613, "Memo" and corresponding line 615 and "Signature" and corresponding line 617.

The pressure-sensitive area and text 605 may be included in a first portion of check 600. Check 600 may include a second portion. The second portion may include chip 601. The second portion has different dimensions in the first portion, specifically a different width, a different length and, in some embodiments, a different thickness. The second portion may include first side 619, second side 623 and third side 621. The second side may be positioned 53.98 mm away from the first side.

The second portion may have rounded edge 625 and rounded edge 627. Rounded edges 625 and 627 may have a radius within the limits of a standard credit card's rounded edges. For example, each rounded corner may have a radius between 2.88 mm and 3.48 mm.

Dimensions of chip 601 and the position of chip 601 relative to first side 619, second side 623 and third side 621 are described above in relation to the first, second and third side of checks in accordance with the invention that include the chip.

The second portion may have the thickness of a standard credit card. Third side 621 may have a length equal to a standard width of a credit card. These dimensions may ensure that the second portion is shaped to be inserted into a standard chip reader.

Thus, systems and methods for an erasable reusable check have been provided. Persons skilled in the art will appreciate that the present invention can be practiced by other than the described embodiments, which are presented for purposes of illustration rather than of limitation.

What is claimed is:

1. An erasable, reusable check having a first face and a second face opposite the first face, the check comprising:
   an active radio frequency identification ("RFID") tag and an RFID antenna positioned between the first and second face, the RFID tag storing a bank account number and a routing number;
   a pressure-sensitive area on the first face including:
      an array of pressure-sensitive organic light emitting diodes ("OLEDs") configured to light up when depressed;
      a processor for translating pressure received by the pressure-sensitive area into pixelated data; and
      a transmitter for transmitting the pixelated data to the RFID tag via a communication means;
   the communication means being positioned between the first and second face and being configured to transmit data between the pressure-sensitive area and the RFID tag;
   a button positioned on the first face, wherein depression of the button activates the RFID antenna to transmit data stored in the RFID tag to an RFID reader, the transmitted data including the bank account number, the routing number and the pixelated data; and
   a battery positioned between the first and second face and accessible from the second face;
   wherein:
      the check is flexible;
      the check has a length of 6 inches and a width of 2¾ inches;
      the check does not include written data identifying a customer bank account and a routing number;
      a first portion of the first face and a first portion of the second face is covered with paper; and
      the OLEDs are configured to turn off upon receipt of an instruction from the RFID tag via the communication means, the RFID tag generating the instruction upon receipt of a message, by the RFID antenna, that the data transmitted to the RFID reader has been received.

2. The check of claim 1 further comprising a metal cover coupled to the first face and rotatable between a first position and a second position wherein:
   the metal cover, in the first position, covers the RFID tag; and
   the metal cover, in the second position, does not cover the RFID tag.

3. The check of claim 1 wherein the OLEDs are configured to display the strokes of an inkless pen when the pen applies pressure to the pressure sensitive area.

4. The check of claim 1 wherein the RFID tag includes a non-transitory memory, the memory including:
   storage for storing the bank account number and the routing number, wherein the storage of the bank account number and the routing number cannot be overwritten; and
   overwritable data storage for storing the pixelated data, wherein the overwritable data storage is erased upon the receipt of a message by the RFID tag that data transmitted from the RFID tag to the RFID reader has been received.

5. The check of claim 1 wherein the thickness of the check is no greater than 0.8 millimeters.

6. The check of claim 1 wherein the pressure-sensitive area includes permanent markings positioned on a top face of the pressure-sensitive area and viewable to a customer.

7. The check of claim 1 wherein depression of the button initiates a transfer of data from the pressure-sensitive area to the RFID tag.

* * * * *